(12) United States Patent
Preston

(10) Patent No.: US 10,077,681 B2
(45) Date of Patent: Sep. 18, 2018

(54) COMPLIANT HEAT SHIELD LINER HANGER ASSEMBLY FOR GAS TURBINE ENGINES

(71) Applicant: UNITED TECHNOLOGIES CORPORATION, Farmington, CT (US)

(72) Inventor: Lon H. Preston, Hobe Sound, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 422 days.

(21) Appl. No.: 14/759,623

(22) PCT Filed: Dec. 13, 2013

(86) PCT No.: PCT/US2013/075026
§ 371 (c)(1),
(2) Date: Jul. 7, 2015

(87) PCT Pub. No.: WO2014/126641
PCT Pub. Date: Aug. 21, 2014

(65) Prior Publication Data
US 2015/0354412 A1 Dec. 10, 2015

Related U.S. Application Data

(60) Provisional application No. 61/764,587, filed on Feb. 14, 2013.

(51) Int. Cl.
*F01D 25/28* (2006.01)
*F23R 3/00* (2006.01)
(Continued)

(52) U.S. Cl.
CPC .............. *F01D 25/28* (2013.01); *B23P 15/00* (2013.01); *F02C 7/20* (2013.01); *F02K 1/80* (2013.01);
(Continued)

(58) Field of Classification Search
CPC . E05Y 2201/602; F01D 25/24; F01D 25/243; F01D 25/28; F02C 7/20;
(Continued)

(56) References Cited

U.S. PATENT DOCUMENTS 3,826,088 A 7/1974 Nash et al.
4,869,616 A * 9/1989 Linnemeier .......... B23K 11/002
219/56
(Continued)

FOREIGN PATENT DOCUMENTS

EP 2541147 A2 1/2013

OTHER PUBLICATIONS

International Search Report for related PCT Application No. PCT/US13/075026; report dated Apr. 15, 2014.
(Continued)

*Primary Examiner* — Gerald L Sung
*Assistant Examiner* — Scott Walthour
(74) *Attorney, Agent, or Firm* — Cantor Colburn LLP

(57) ABSTRACT

Hanger assemblies for coupling heat shield liners to cases of gas turbine engines are disclosed. The disclosed hanger assemblies include a pivoting joint coupled between a first segment and a second segment. The first segment is coupled to the liner by a liner attachment assembly and the second segment is coupled to the case by a case attachment assembly. At least one of the liner attachment assembly or the case attachment assembly permits translational movement of the
(Continued)

first or second segments respectively with respect to the liner or case to accommodate for thermal expansion in the axial direction.

20 Claims, 12 Drawing Sheets

(51) Int. Cl.
*B23P 15/00* (2006.01)
*F02K 9/34* (2006.01)
*F23R 3/60* (2006.01)
*F02K 1/82* (2006.01)
*F02C 7/20* (2006.01)
*F02K 1/80* (2006.01)

(52) U.S. Cl.
CPC .............. *F02K 1/82* (2013.01); *F02K 1/822* (2013.01); *F02K 9/34* (2013.01); *F02K 9/343* (2013.01); *F02K 9/346* (2013.01); *F23R 3/005* (2013.01); *F23R 3/60* (2013.01); *F05D 2230/642* (2013.01); *Y02T 50/675* (2013.01); *Y10T 29/49325* (2015.01)

(58) Field of Classification Search
CPC ... F02K 1/80; F02K 1/82; F02K 1/822; F02K 9/34; F02K 9/343; F02K 9/346; F02K 9/974; F05D 2240/14; F05D 2240/15; F05D 2240/90; F16C 11/04–11/0619; F16C 11/0661; F16M 13/00; F23R 3/002; F23R 3/005; F23R 3/60; F23R 2900/00018
See application file for complete search history.

(56) References Cited

U.S. PATENT DOCUMENTS

| | | | | |
|---|---|---|---|---|
| 5,088,279 | A | * | 2/1992 | MacGee ................... F02C 7/20 60/226.1 |
| 5,249,419 | A | | 10/1993 | Landhuis |
| 6,182,437 | B1 | | 2/2001 | Prociw |
| 7,509,813 | B2 | | 3/2009 | Stastny |
| 7,721,548 | B2 | | 5/2010 | Patel et al. |
| 7,748,221 | B2 | | 6/2010 | Patel et al. |
| 7,770,397 | B2 | | 8/2010 | Patel et al. |
| 7,775,047 | B2 | | 8/2010 | Fish et al. |
| 7,814,753 | B2 | | 10/2010 | Farah et al. |
| 7,827,800 | B2 | | 11/2010 | Stastny et al. |
| 7,845,174 | B2 | | 12/2010 | Parkman et al. |
| 7,861,535 | B2 | | 1/2011 | Figueroa et al. |
| 7,926,286 | B2 | | 4/2011 | Morenko et al. |
| 9,255,548 | B2 | * | 2/2016 | Preston, III .............. F02K 1/822 |
| 2002/0064455 | A1 | | 5/2002 | Toffan et al. |
| 2005/0016182 | A1 | * | 1/2005 | Morenko ................... F23R 3/50 60/800 |
| 2007/0151229 | A1 | * | 7/2007 | Farah ...................... F02K 1/002 60/232 |
| 2007/0158527 | A1 | | 7/2007 | Farah et al. |
| 2008/0022689 | A1 | * | 1/2008 | Farah ...................... F01D 25/30 60/770 |
| 2009/0077978 | A1 | * | 3/2009 | Figueroa .................. F02C 7/20 60/766 |
| 2009/0293498 | A1 | | 12/2009 | Petty et al. |
| 2009/0317175 | A1 | | 12/2009 | Martinez |
| 2011/0016879 | A1 | * | 1/2011 | Farah ....................... F02C 7/20 60/796 |

OTHER PUBLICATIONS

Supplementary European Search Report and Communication; Application EP 13 87 4990; Dated Sep. 21, 2016, 7 pages.

* cited by examiner

COMPLIANT HEAT SHIELD LINER HANGER ASSEMBLY FOR GAS TURBINE ENGINES

REFERENCE TO RELATED APPLICATION

This application is a US National Stage under 35 U.S.C. § 371 of International Application No. PCT/US13/75026 filed on Dec. 13, 2013, and claims priority under 35 U.S.C. § 119(e) to U.S. Provisional Ser. No. 61/764,587 filed on Feb. 14, 2013.

TECHNICAL FIELD

This disclosure relates generally to gas turbine engines and, more particularly, to hanger assemblies for supporting and installing heat shield liners in gas turbine engines.

DESCRIPTION OF THE RELATED ART

Many modern gas turbine engines are of the turbofan jet type, which generally include a low pressure compressor (LPC) for initially compressing air flowing into the engine. The LPC is coupled to and driven by a low pressure turbine (LPT) via a shaft or spool. The LPC is disposed upstream of a high pressure compressor (HPC) and acts to supercharge or compress the air entering the HPC. The HPC is coupled to and driven by a high pressure turbine (HPT) via another shaft or spool. The HPT is typically disposed upstream of the LPT so the HPC and HPT are disposed between the LPC and the LPT. A combustion chamber is disposed between the HPC and HPT so high energy fuel can be mixed with the compressed air from the HPC and ignited to form a high energy gas stream for driving the HPT and LPT which, in turn, drive the HPC and LPC respectively.

Such a high energy gas stream can damage certain components of a gas turbine engine, particularly the case structure which surrounds the engine components. For example, one use for heat shield liners is as a liner for an exhaust nozzle of a gas turbine engine. Specifically, it is well known in the gas turbine engine art that extreme temperatures can develop in an exhaust nozzle. For example, during an after-burner operation, the extreme temperatures can cause failure by burning through the nozzle wall. To address this problem, one prior art liner device places a plurality of perforated panels inside the nozzle. The panels are held and positioned away from the nozzle wall by supports that create a cooling air plenum between the nozzle wall and the panels. Under extreme temperatures, cooling air is forced into the plenum and out of the perforated holes in the panels, which lowers the temperature at the nozzle wall. However, the panels move in response to changes in pressure and temperature. This movement can create openings between the panels that must be sealed as best possible or hot spots can develop on the nozzle wall. These particular liner devices are more suitable to nozzles having flat walls as installation in a curved, cylindrical or conical nozzle structure is difficult, time consuming and therefore costly.

An additional use for heat shield liners can be found in an augmenter of a gas turbine engine. Augmenters are used to increase the thrust output. Additional fuel is injected into an exhaust duct formed downstream of the LPT and is ignited to provide an additional high energy gas stream which, in certain circumstances, is mixed with fan airflow and then ejected through an exhaust nozzle system to provide high energy thrust output from the engine. An augmenter is normally located within the exhaust duct of the engine, and, in most cases, some heat shielding must be provided for protecting the exhaust duct from the extremely high temperatures associated with the augmenter. One way to provide this protection is to position a heat shield liner within the structural case that defines the exhaust duct and to pass cooling air between the liner and the structural case. The cooling air may be air that bypasses the compressors and turbines or a mixture of such bypass air and air passing through the compressors and turbines.

A number of basic problems confront the designer of heat shield liners. A first problem is concerned with structural stabilization of the relatively lightweight, tubular structures which form the liners. The liners are spaced radially inwardly from the structural case and are prone to thermal expansion in an axial direction, which causes translational or lateral movement of the liner with respect to the case, typically in the aft direction. The liners are also subjected to substantial internal pressure by the high energy combustion gases. Further, in order to assure a relatively constant flow of cooling air between the case and the liner, it is necessary that the coolant air pressure between the liner and the case be greater than the pressure of the combustion gases inside the liner. In such a situation, the coolant can flow through slots or openings provided in the liner and to form a film of coolant on the inside of the liner, thereby protecting the liner from the high energy combustion gases within the liner. Because the pressure is greater on the outside of the liner than on the inside, the thin liner shells must be stabilized against buckling or collapsing radially inwardly and because of the thermal expansion in an axial direction, the liners must be capable of translational or lateral movement without creating gaps or openings that expose the case to the combustion gases.

One such manner of stabilizing heat shield liners is to couple the liner to the structural case in a spaced-apart manner by a series of hanger assemblies which are mounted to the inside of the case and connected to various points or similar hangers mounted along the liner as disclosed in U.S. Pat. Nos. 7,814,753 and 7,861,535.

As an example, FIG. 1 shows a sectional view of an exhaust system 30 for a gas turbine engine which includes an exhaust duct case 31 that is coupled to a heat shield liner 32 by a plurality of hangers shown generally at 33. A gas turbine engine is shown schematically at 34. Similarly, another exhaust system 40 for a gas turbine engine 34 is shown in FIG. 2. An exhaust duct case 41 is connected to one or more heat shield liners 42 by a plurality of hangers 43.

As can be seen from FIGS. 1 and 2, a large number of hangers 33, 43 are required to secure the liners 32, 42 to the cases 31, 41. Each hanger 33, 43 includes a plurality of parts and, as will be apparent to those skilled in the art, it is very difficult to assemble the liners 32, 42 to the cases 31, 41 due to the number of parts included in each hanger 33, 43 and complicated assembly procedures that may require shimming or other procedural steps. Further, the systems of FIGS. 1 and 2 do not provide for any translational or lateral movement of the liners 32, 42 in an axial direction to compensate for thermal expansion.

All known prior art mounting systems present challenges in the practical assembly of a heat shield liner in a gas turbine engine because of the multiplicity of hangers and tracks and because of the time and difficulty involved in attempting to properly line up an install the numerous mounting members within a confined space. Thus a hanger assembly for heat shield liners is needed that requires fewer parts and that is easier to assemble and install. Further, there is a need for such a hanger assembly that permits translational or lateral movement in either axial direction to compensate for thermal expansion.

SUMMARY OF THE DISCLOSURE

For purposes of this disclosure, the term pivoting joint will be used to cover universal joints, swivel joints, ball joints and other like joints that will be apparent to those skilled in the art. Further, for purposes of this disclosure, the term "proximal" refers to an end of a part or component that appears below the main body of the part or component in the drawings. Further, the term "distal" refers to an end of a part or component that appears above the main body of the part or component in the drawings.

A hanger assembly for coupling a heat shield liner to a case is disclosed. The liner may be connected to and closely spaced apart from the case by a plurality of hanger assemblies. Each hanger assembly may include a first segment coupled to a second segment by a pivoting joint. The pivoting joint may be a universal joint, swivel joint, ball joint or other similar joint that will be apparent to those skilled in the art. The first segment may be coupled to the liner by a liner attachment assembly. The second segment may be coupled to the case by a case attachment assembly. At least one of the liner attachment assembly and the case attachment assembly permits translational movement of the first or second segments respectively with respect to the liner or case respectively.

In another aspect, a method for mounting a heat shield liner inside a case is disclosed. The method may include providing a plurality of hanger assemblies connecting the liner to the case. Each hanger assembly may include a first segment coupled to a second segment by a pivoting joint, a liner attachment assembly and a case attachment assembly. The method may further include, for each hanger assembly, connecting the liner attachment assembly to the liner. The method may then further include connecting the first segment to the second segment to form the pivoting joint, connecting the first segment to the liner attachment assembly, connecting the case attachment assembly to the case and connecting the case attachment assembly to the second segment.

In yet another aspect, a hanger assembly for coupling a heat shield liner to an outer case of a gas turbine engine is disclosed. The hanger assembly may include a pivoting joint coupling a first segment and a second segment. The first segment may be coupled to the liner by a liner attachment assembly while the second segment may be coupled to the case by a case attachment assembly. The case attachment assembly may include an annular bushing threadably connected to the case with a fastener that passes through the annular bushing and that has a distal head and a proximal threaded end connected to a distal threaded end of the second segment. At least one of the liner attachment assembly and the case attachment assembly permits translational movement of the lower or upper segments respectively with respect to the case.

In any one or more of the embodiments described above, the case attachment assembly may include an annular outer bushing that passes through and that may be connected to the case. The outer bushing accommodates a fastener that may couple the outer bushing to the second segment. The fastener may be spaced apart from the outer bushing to permit translational movement of the second segment and fastener with respect to the outer bushing and the case.

In any one or more of the embodiments described above, the case attachment assembly may include an annular outer bushing that passes through and that may be connected to the case. The outer bushing accommodates an annular inner bushing. The inner bushing may be coupled to a fastener that couples the inner bushing to the second segment. The inner bushing may be spaced apart from the outer bushing to permit translational movement of the second segment and fastener with respect to the outer bushing and the case.

In any one or more of the embodiments described above, the outer bushing may be threadably connected to the case.

In any one or more of the embodiments described above, the fastener may include a proximal threaded section that connects the fastener to the second segment. The fastener may also include a distal head disposed opposite the outer bushing from the proximal threaded section and a middle shoulder section disposed between the head and the proximal threaded section. The middle section is wider than the proximal threaded section.

In any one or more of the embodiments described above, the liner attachment assembly may include a stud connected to the liner that may be threadably connected to the first segment.

In any one or more of the embodiments described above, the second segment of the hanger assembly may include a proximal forked end and the first segment may also include a distal forked end that may be pivotally connected to the proximal forked end of the second segment by a cross member that may form the pivoting joint.

In any one or more of the embodiments described above, the second segment may include a distal end that may be pivotally connected to a swivel. The first segment may include a distal forked end that may be pivotally connected to a cross member that passes through the swivel thereby forming the pivoting joint.

In any one or more of the embodiments described above, the case attachment assembly may include a washer plate disposed opposite the case from the second segment. The washer plate may include a center slot disposed between a pair of openings. The openings may each be connected to the case by a stud that may be connected to the case.

As a further refinement of this concept, a cover is disposed over the washer plate with the washer plate disposed between the cover and the case. The head of the bolt may be disposed between the washer plate and the cover.

In any one or more of the embodiments described above, the case attachment assembly may include an annular bushing that may be threadably connected to the case and a fastener that passes through the bushing before it may be connected to the second segment. The liner attachment assembly may also include a bracket connected to the liner. The bracket may include a raised section that defines a slot. The first segment may have a proximal threaded end that may be connected to a threaded end of a bolt. The bolt may have a proximal head that may be trapped between the raised section of the bracket and the liner. The raised section of the bracket permits translational movement of the head of the bolt and the first segment but prevents rotational movement of the head of the bolt.

In any one or more of the embodiments described above, the case attachment assembly may include an annular outer bushing that passes through and that is connected to the case. The outer bushing accommodates a fastener that couples the outer bushing to the second segment. The fastener is spaced apart from the outer bushing to define an annular space that permits translational movement of the second segment and fastener with respect to the outer bushing and the case. The fastener may include a proximal threaded section that connects the fastener to the second segment. The fastener may also include a distal head that may be disposed opposite the outer bushing from the proximal threaded section with a middle shoulder section disposed therebetween that may be wider than the proximal threaded section. The case attachment assembly may also include a washer disposed between the head and the outer bushing. The second segment may further include a proximal end that may be pivotally connected to a swivel. The first segment may also include a distal forked end that may be pivotally connected to a cross member that passes through the swivel.

In any one or more of the aspects described above, the case attachment assembly may include a washer plate disposed opposite the case from the second segment. The washer plate may include a center slot disposed between a pair of openings. The openings may each be connected to the case by a stud that may be connected to the case. The second segment is connected to the case by a bolt having a proximal threaded end connected to the second segment and a head that may be slidably disposed above the slot of the washer plate to permit translational movement of the second segment and the bolt along the elongated slot. The case attachment assembly may further include a cover disposed over the elongated washer plate with the washer plate being disposed between the cover and the case. The bolt may have a head disposed between the washer plate and the cover. Further, the liner attachment assembly may include a stud connected to the liner that may be threadably received in a threaded hole disposed at a bottom of the first segment.

In any one or more of the embodiments described above, the case attachment assembly may include an annular bushing that may be threadably connected to the case and a fastener that passes through the annular bushing before being connected to the second segment. The liner attachment assembly may include a bracket connected to the liner. The bracket may include a raised section that defines a slot. The first segment may have a proximal threaded end that may be connected to a threaded end of a bolt. The bolt may have a proximal shaped head that may be trapped between the raised section of the bracket and the liner. The shaped head prevents the bolt from being rotated within the raised section. The slot is used to permit translational movement of the head of the bolt and the first segment.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

Figure 1:
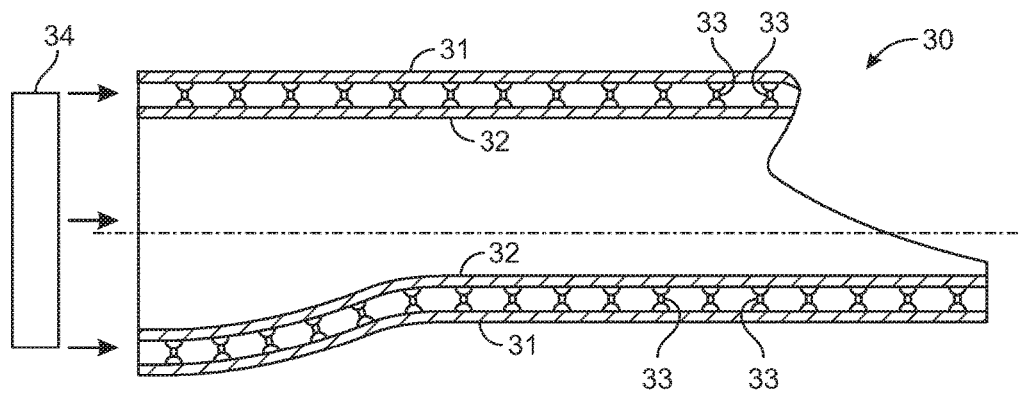
FIG. 1 is a sectional view of a prior art exhaust duct for a gas turbine engine equipped with a conventional heat shield liner.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

In the drawings, the term proximal refers to an end of a component appearing towards the bottom of a figure while the term distal refers to an end of a component appearing towards the top of a figure. Because a section of a gas turbine engine case may be generally cylindrical, one skilled in the art will realize that the figures could be presented in an inverted fashion and still depict the components accurately.

Figure 3:
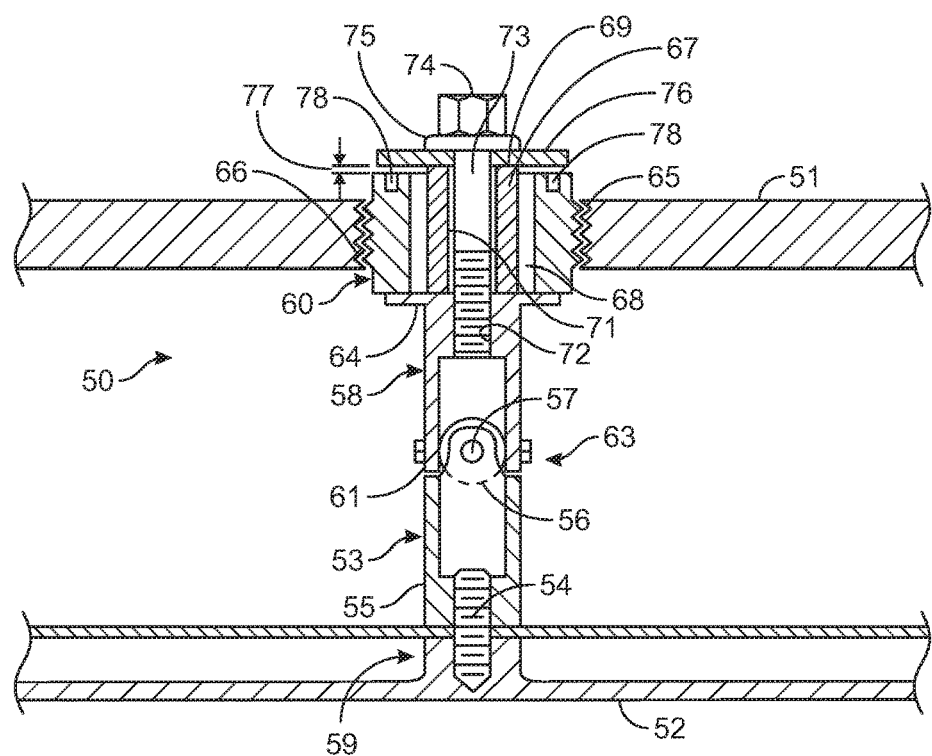
FIG. 3 is a sectional view of one disclosed hanger assembly used to connect a heat shield liner to a case.

Turning to FIG. 3, one disclosed hanger assembly 50 is shown that connects a case 51 to a heat shield liner 52 by way of a case attachment assembly 60 and a liner attachment assembly 59. The hanger assembly 50 may include a first segment 53 that is connected to the liner 52 by way of the liner attachment assembly 59 that may include fastener or stud 54 that may be fixed, attached or coupled to the liner 52. The stud 54 is threaded. Other types of liner attachment assemblies 59 may also be used for attaching the first segment 53 to the liner 52, as will be apparent to those skilled in the art. In addition to its threaded proximal end 55, the first segment 53 may include a distal end 56 that is coupled to a cross member 57. The hanger assembly 50 may also include a second segment 58 that may include a proximal end 61 that similarly may be connected to the cross member 57 wherein the cross member 57 forms a pivoting joint 63. While the pivoting joint 63 shown in FIG. 3 is of the universal type, those skilled in the art will recognize that ball joints, swivel joints or other types of joints may be used as well.

The second segment 58 may also include a flanged distal end 64 that may abut an annular outer bushing 65. The annular outer bushing 65 is threadably connected to the case 51 as the case 51 may include a threaded opening 66 for accommodating the outer bushing 65. The outer bushing 65 may also accommodate an annular inner bushing 67 with a gap 68 disposed between the inner and outer bushings 67, 65. The inner bushing 67 has a clearance hole 71, while the flanged distal end 64 of the second segment 58 may have a threaded inner surface 72. The threaded inner surface 72 and the inner bushing 67 are connected together by the threaded fastener 73. Of course, those skilled in the art will realize that the inner bushing 67 may be connected to the second segment 58 by means other than using a threaded fastener 73. The fastener 73 may also include a distal head 74 that may include a flange 75. The flange 75 traps a washer 76 between the distal head 74 and the inner bushing 67.

The hanger assembly 50 provides certain clearances for translational (lateral) movement, especially in either axial direction to compensate for thermal expansion. Specifically, during installation, the threaded outer bushing 65 is rotated using a spanner wrench received in the recesses 78 until light contact occurs between the outer bushing 65 and the flanged distal end 64 of the second segment 58. The bushing 65 may be locked in place with adhesive, staking or use of a jam nut (not shown). The inner bushing 67 may be longer than the outer bushing 65. Thus, when the fastener 73 and washer 76 are installed, they engage the distal end 69 of the inner bushing 67 thereby leaving the gap 77 between the outer bushing 65 and the washer 76. Additionally, the gap 68 may be disposed between the inner and outer bushings 67, 65 respectively. The gaps 77, 68 provide for translational or lateral movement of the heat shield 52 with respect to the case 51. Translational or lateral movement of the heat shield 52 with respect to the case 51 may be caused by thermal expansion of the heat shield 52 in either axial direction as well as misalignment caused by pivotal movement at the pivoting joint 63.

Turning to FIGS. 4-10, yet another hanger assembly 150 is disclosed that connects a case 51 to a liner 52. The hanger assembly 150 may include liner attachment assembly 159 and a case attachment assembly 160. The liner attachment assembly couples a first segment 153 to the liner 52 with a threaded proximal end 155 that may be secured to the liner 52 by way of a stud 154. The stud 154 emerges from a node 82 that may be formed by intersecting ribs 81 as shown in FIGS. 5-10. The first segment 153 may also include a distal end 156 that is coupled to a cross member 157 that passes through a swivel 162 disposed at the proximal end 161 of the second segment 158 to form the pivoting joint 163. The second segment 158 may include a flanged distal end 164 with a threaded opening 172 that may be used to couple the second segment 158 to the case 51 by way of the case attachment assembly 160. The case attachment assembly 160 may include the bushing 165 and the fastener 173. The threaded opening 172 in the second segment 158 receives the fastener 173, which may also include a head 174 that may be disposed above a washer 176. Instead of two bushings, the hanger assembly 150 may include a single annular bushing 165 that may be connected to the case 51 via a threaded connection as shown in FIGS. 4 and 7-10. The gap 168 between the bushing 165 and the fastener 173 as well as the gaps 177, 277 between the bushing 165 and the washer 176 and between the bushing 165 and flanged distal end 164 respectively provide for translational or lateral movement caused by assembly tolerances or relative motion between case 51 and liner 52 due to thermal expansion.

Figure 4:
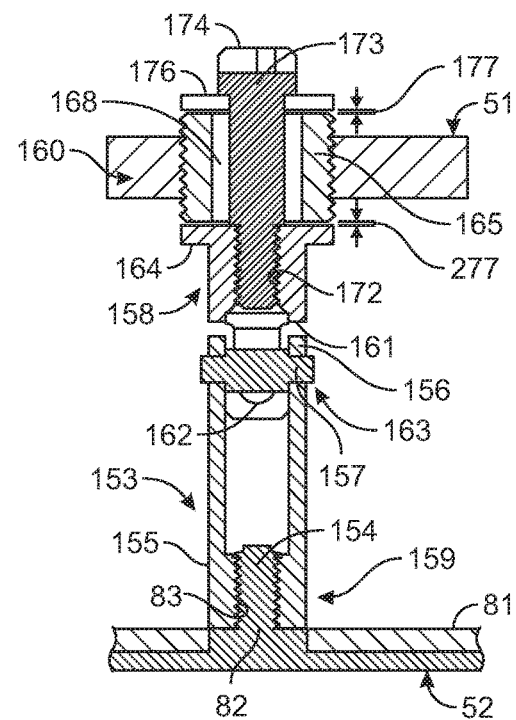
FIG. 4 is a sectional view of yet another disclosed hanger assembly used to connect a liner to a case.
Figure 5:
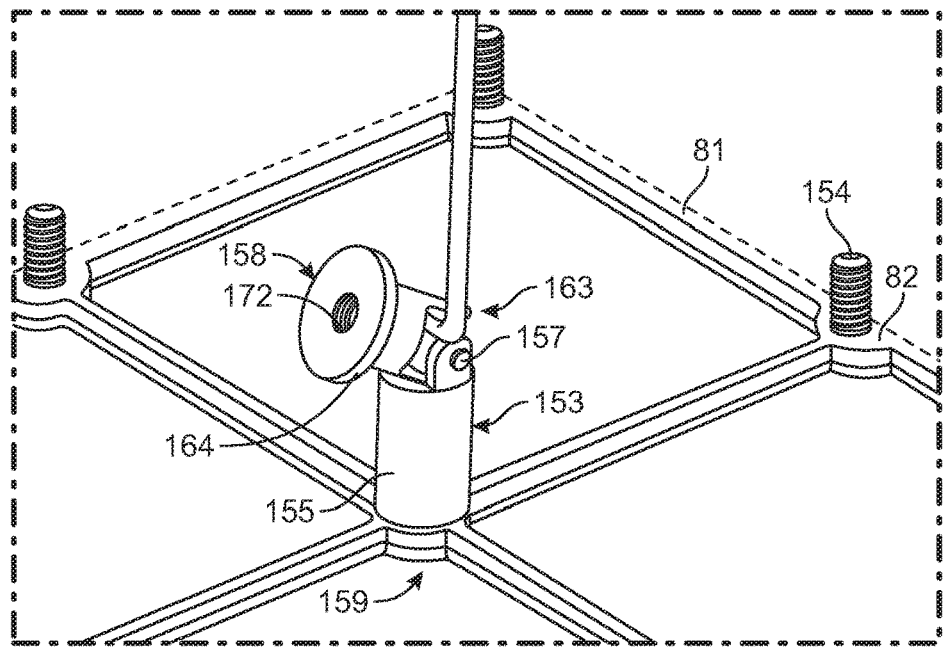
FIGS. 5-10 illustrate an assembly sequence of the hanger assembly shown in FIG. 4 resulting in the hanger assembly being connected to a liner and the case.
Figure 6:
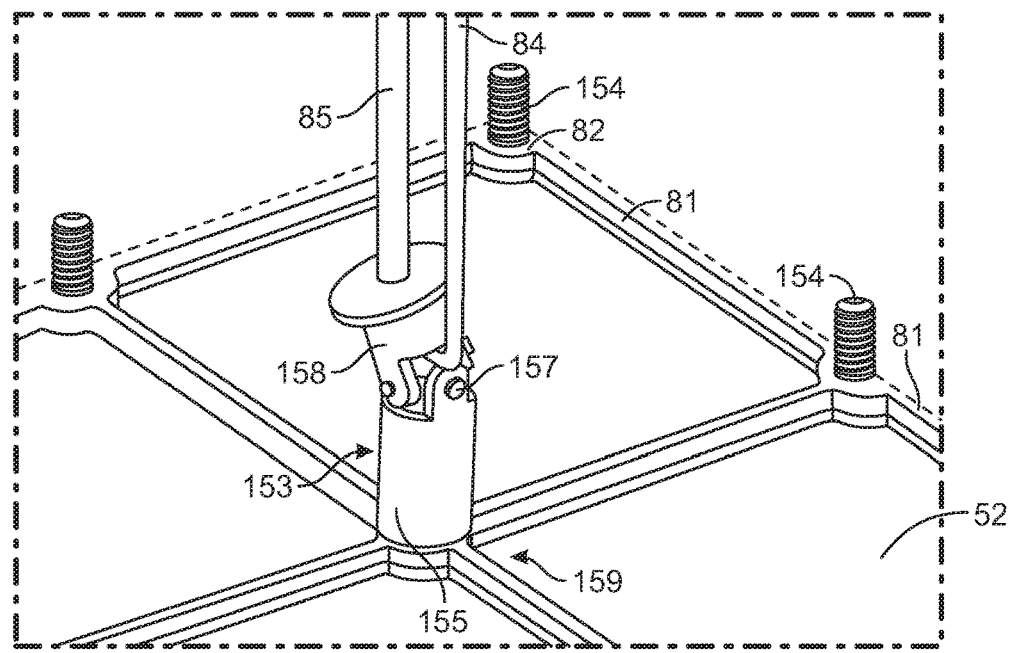
Figure 7:
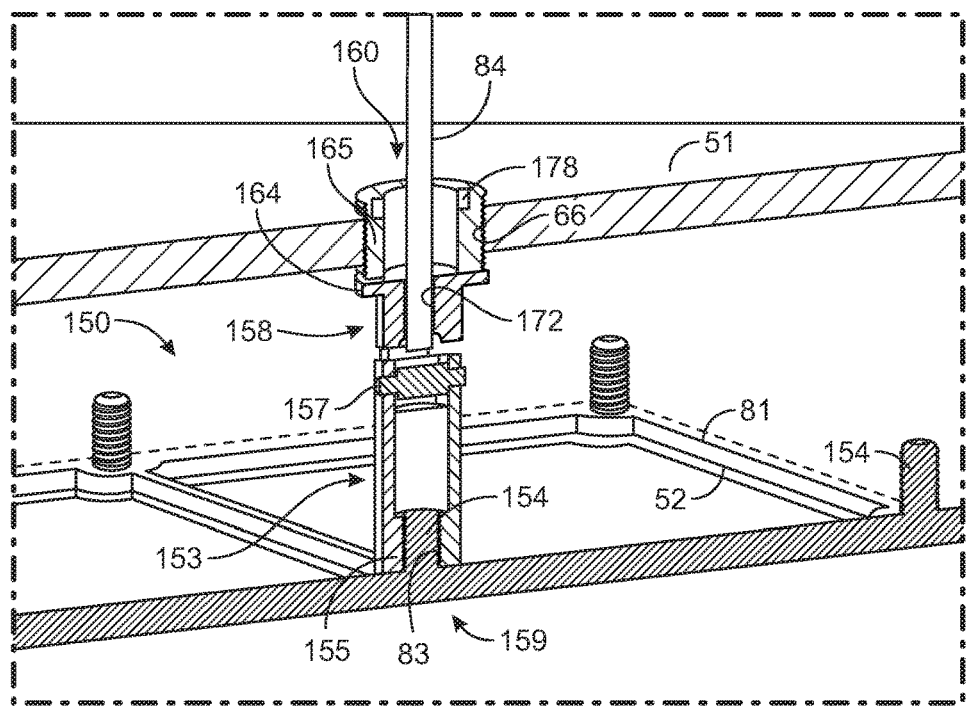
Figure 8:
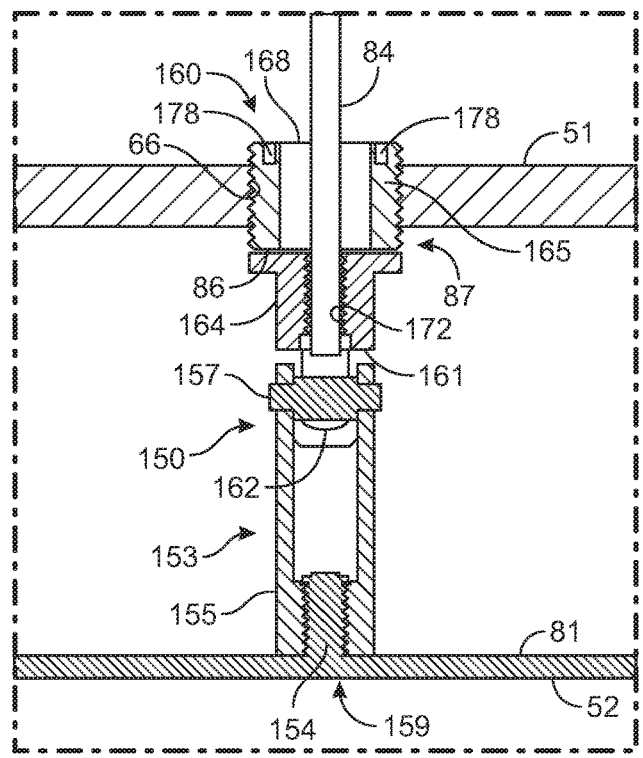

A sequence for assembling the hanger assembly 150 shown in FIG. 4 is illustrated in FIGS. 5-10. First, the swivel and second segment 158 are preassembled to the first segment 153 with the cross member 157 thereby forming the pivoting joint 163. Self-locking thread elements may be disposed within the threaded hole 83 of the distal end 155 of the first segment 153. A hook 84 may be employed and inserted through the opening 66 in the case 51 (FIG. 7) to engage the second segment 158 and to manipulate the second segment 158 into a vertical orientation as shown in FIG. 6. A tool or rod 85 may be employed to hold the second segment 158 in place while the hook 84 may be removed as shown in FIG. 6. Using the rod 84 to hold the second segment 158 in an upright position, the outer bushing 165 may be installed over the rod 84 and into the threaded opening 66 as shown in FIG. 7. As shown in FIG. 8, after contact between the proximal face 86 of the bushing 65, the bushing 65 may be rotated or unthreaded slightly to produce a small gap 87 which contributes to the translational or lateral tolerance of the hanger assembly 150. The bushing 65 may then be locked into position using self locking threads or by staking.

Figure 9:
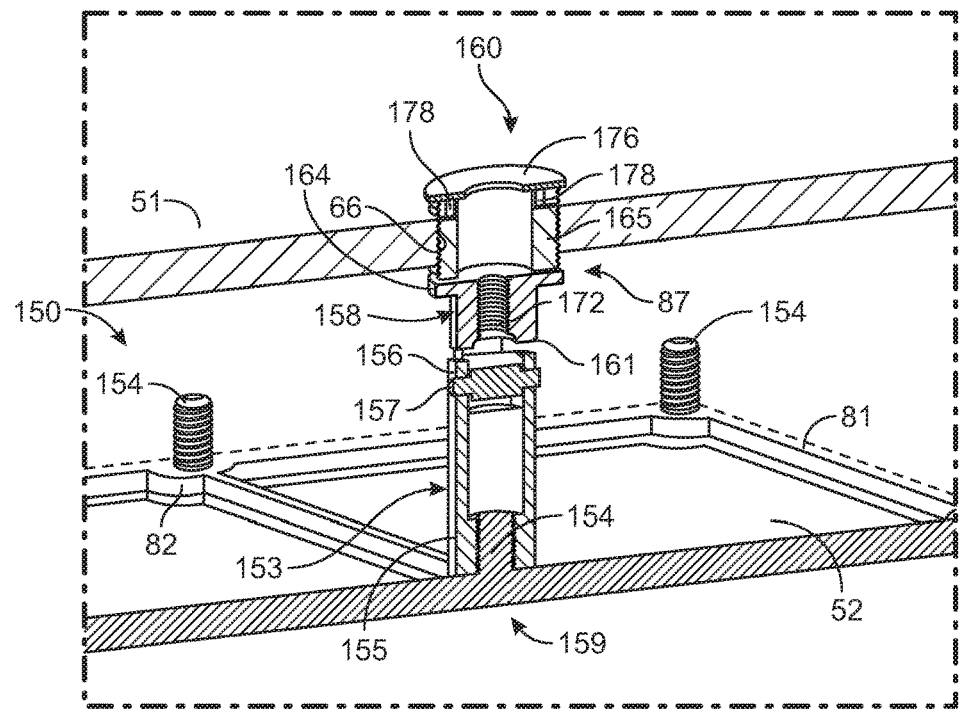
Figure 10:
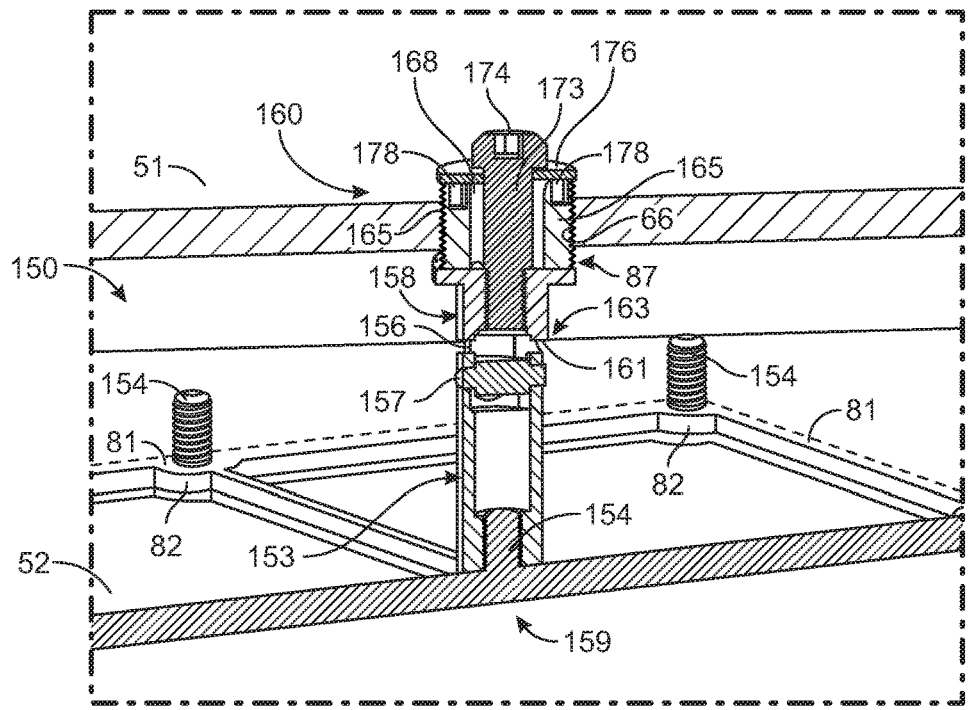

Turning to FIG. 9, the rod 84 may be removed and the washer 176 is placed over the bushing 165. Turning to FIG. 10, the fastener 173 may be inserted through the washer 176, the bushing 165 and the clearance or gap 168 before being coupled to the second segment 158. The gap 168 provides for translational or lateral movement caused by thermal expansion of the heat shield liner 52. As shown in FIGS. 8-10, recesses 178 are provided in the bushing 165 for installing the bushing 165 with a spanner wrench.

Figure 11:
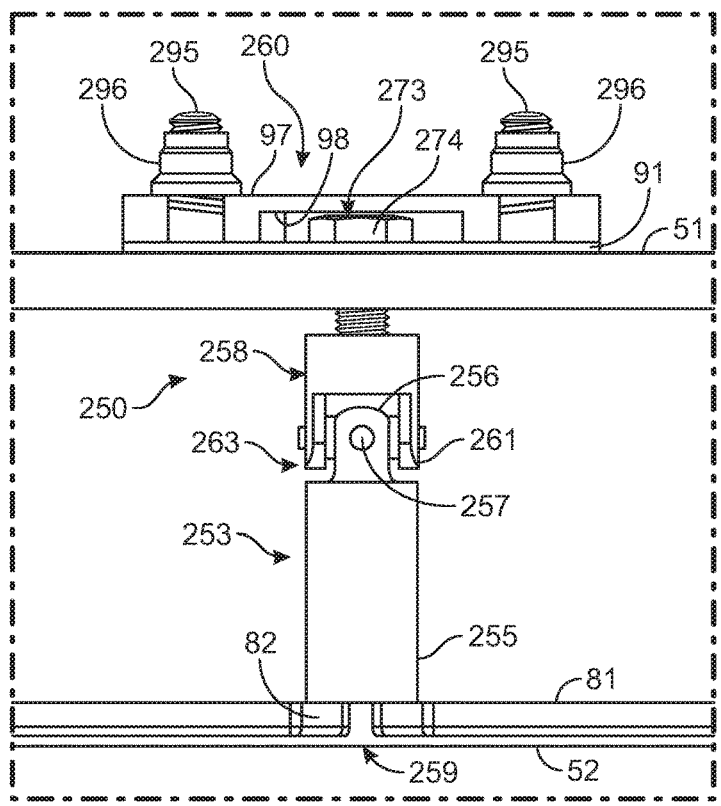
FIG. 11 is a plan view of yet another disclosed hanger assembly.
Figure 12:
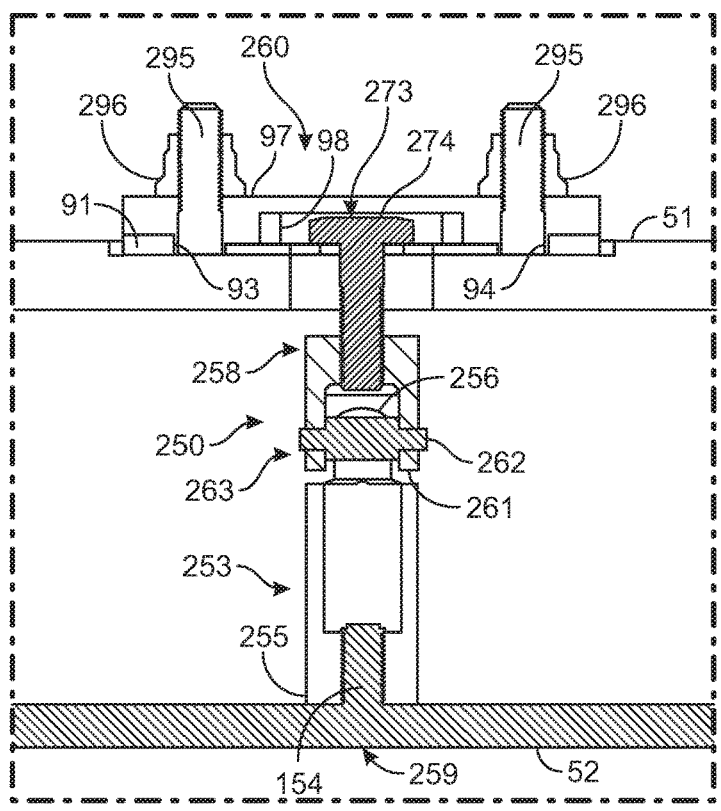
FIG. 12 is a sectional view of the hanger assembly shown in FIG. 12.
Figure 13:
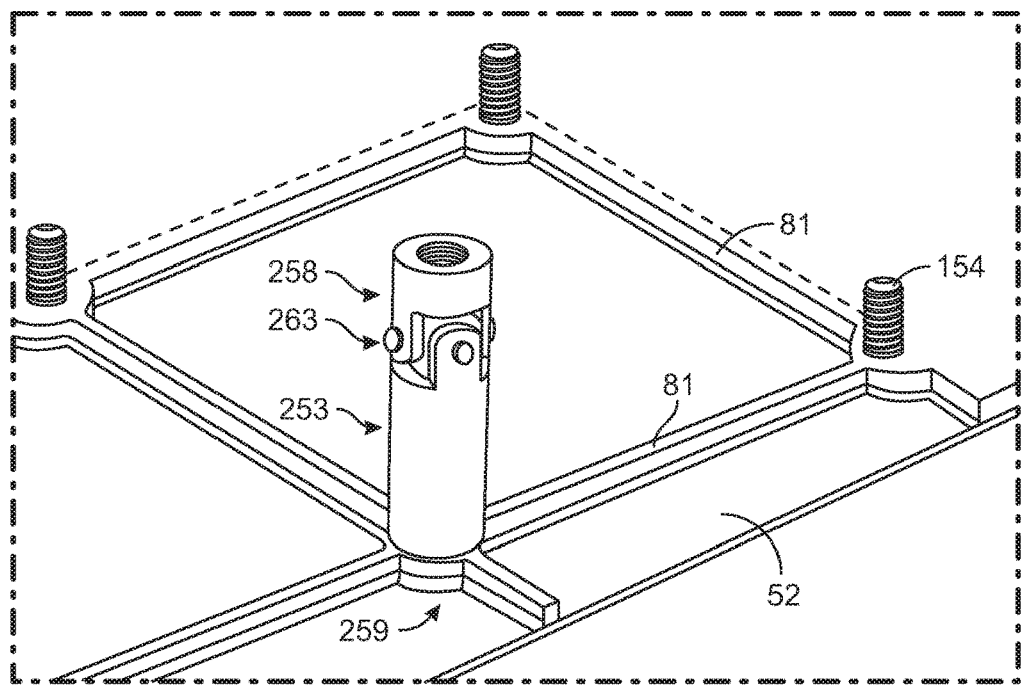
FIGS. 13-18 illustrate the assembly sequence for the hanger assembly shown in FIGS. 11-12.
Figure 14:
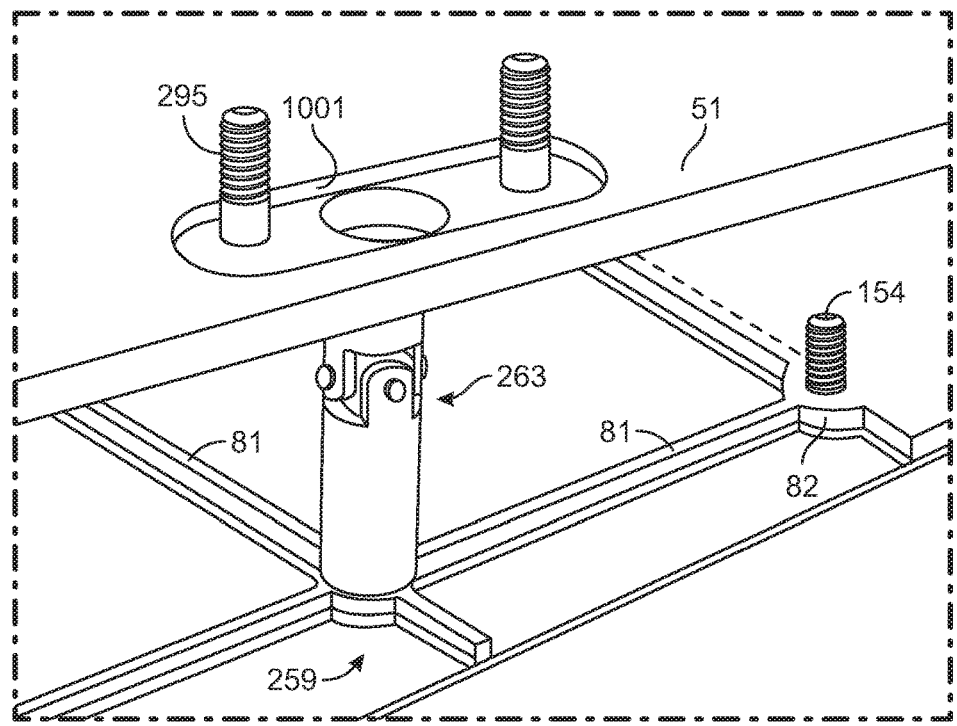

Turning to FIGS. 11-12, yet another hanger assembly 250 is disclosed that connects a case 51 to a liner 52 in a spaced-apart fashion. As a part of the liner attachment assembly 259, reinforcing ribs 81 (FIG. 11) are provided that intersect with other like ribs 81 to form nodes 82 for supporting studs 154 (FIG. 12) as shown in FIGS. 13-14. Returning to FIGS. 11-12, the hanger assembly 250 may include a first segment 253 with a forked distal end 256 that accommodates a cross member 257. As shown in FIG. 12, the proximal end 255 of the first segment 253 may include a threaded opening for accommodating a stud 154 for securing the first segment 253 to the liner 52. The hanger assembly 250 may also include a second segment 258 with a forked proximal end 261 that is also connected to the cross member 257 that forms the pivoting joint 263 with forked distal end 256 of the first segment 253 (see also FIG. 11). The second segment 258 may be connected to the case 51 via the case attachment assembly 260 that may include a fastener 273. The fastener 273 may have a head 274 that rides on top of an elongated washer plate 91, which can be best seen in FIGS. 15-16. The washer plate 91 may include a slot 92 (FIG. 15) within which the fastener 273 may move thereby providing translational or lateral movement of the hanger assembly 250 and liner 52 with respect to the stationary case 51. A conventional bolt or fastener 273 may be used to connect the second segment 258 to the case 51 and other fastening means or case attachment assemblies will be apparent to those skilled in the art. The elongated washer plate 91 may include a pair of openings 93, 94 (FIG. 12) through which studs 295 may extend which, in combination with the nuts 296, are used to secure the washer plate 91 to the case 51. Also shown in FIGS. 11-12 is a cover 97 with a recess 98 disposed in an underside thereof for permitting translational movement of the head 274 of the fastener 273. In the hanger assembly 250, a conventional fastener or bolt 273 may be utilized as opposed to the shoulder bolt 173 shown in the hanger assembly 150 of FIGS. 3-10.

Figure 15:
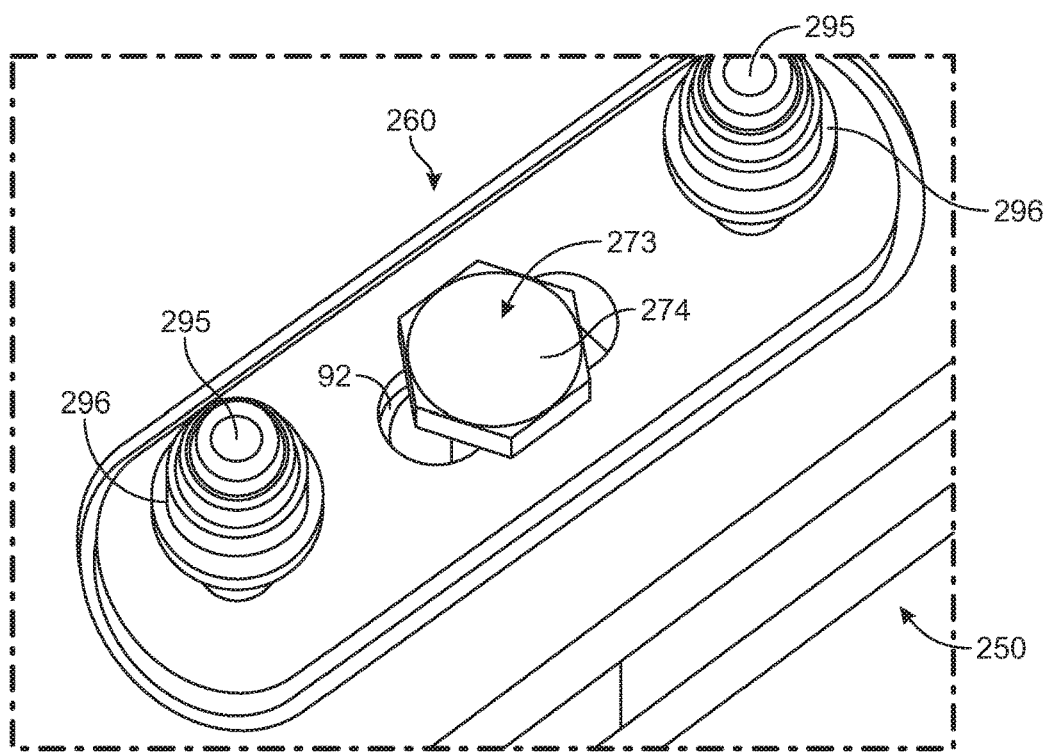
Figure 16:
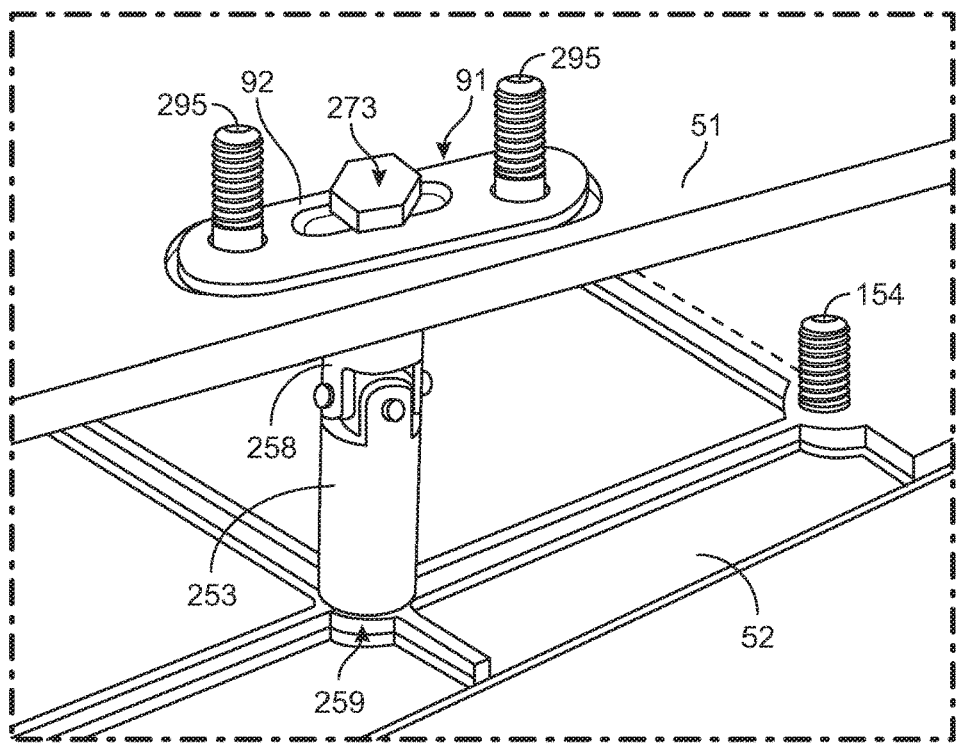
Figure 17:
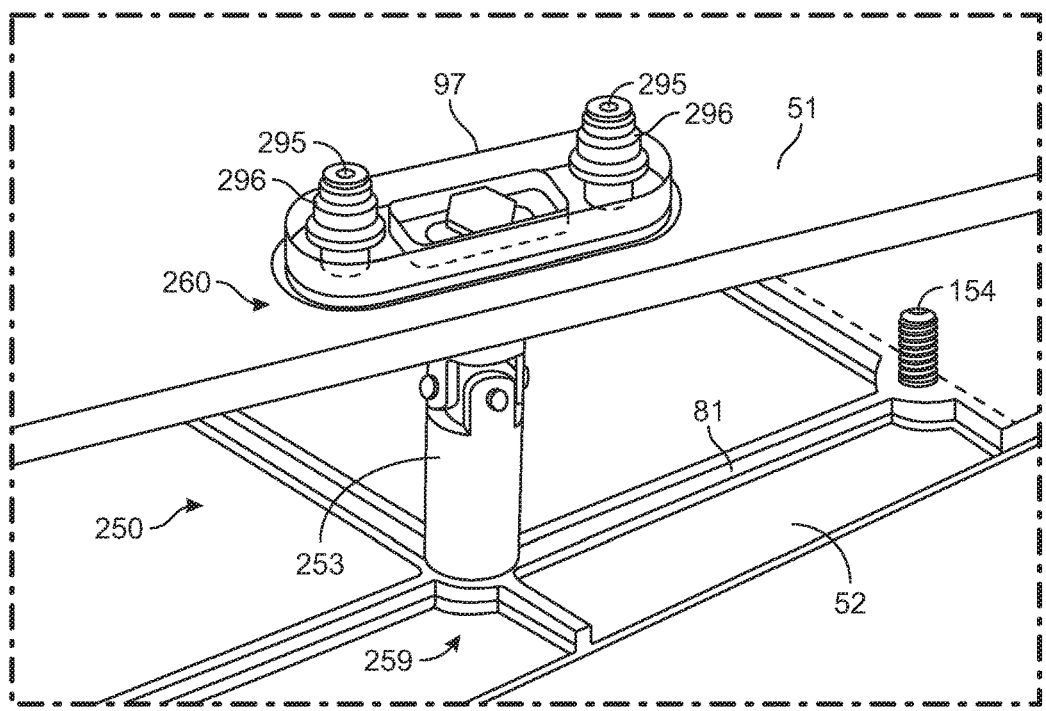
Figure 18:
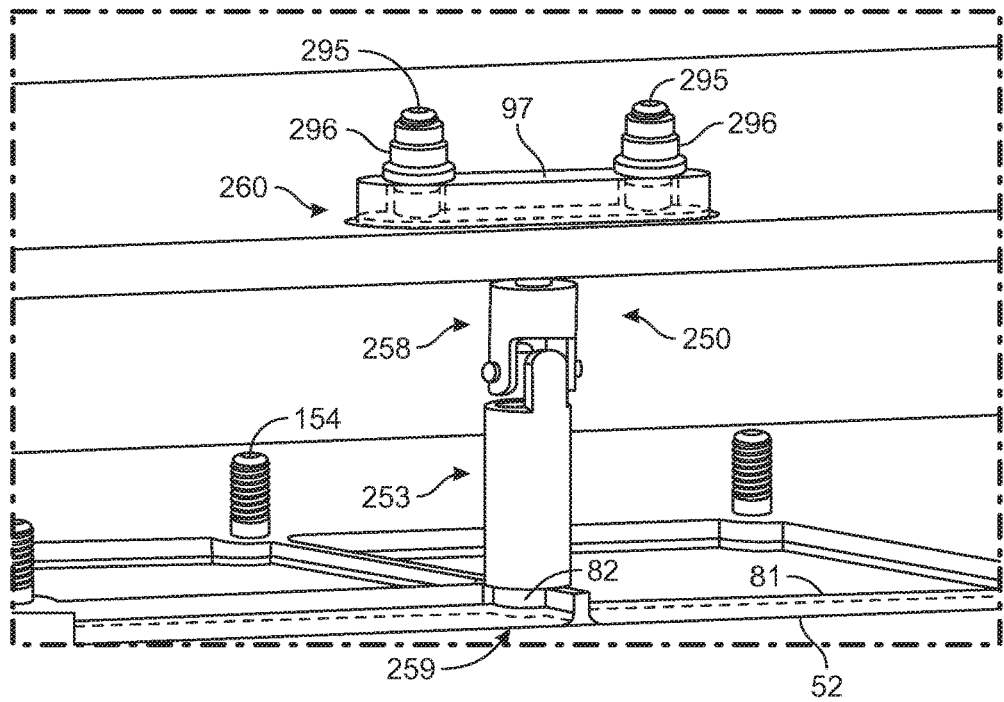

The installation of the hanger assembly 250 is illustrated in FIGS. 13-18. First, in FIG. 13, the first segment 253 may be secured to one of the studs 154 and the pivoting joint 263 has been preassembled, meaning that the second segment 258 may be already coupled to the first segment 253. Again, self-locking thread elements may be used to secure the first segment 253 to the stud 154. Similar to the technique shown in FIGS. 5-6, a tool or rod may be used to place the second segment 258 in an upright or vertical position as shown in FIG. 13. The studs 295 may be integrally connected to the case 51. Further, a recess 1001 is disposed in the case 51 to accommodate the washer plate 91 as shown in FIG. 14. The washer plate 91 may then be installed as shown in FIG. 15 while a tool 84 or rod 85 (not shown in FIG. 15; see FIGS. 5-8) may be used to maintain the second segment 258 in a vertical orientation. The nuts 296 may secure the washer plate 91 in place. Then, the fastener 273, which may be a conventional bolt, may then be inserted through the slot 92 and into the threaded opening of the second segment 258 as shown in FIG. 16. Also, as shown in FIGS. 15-16, the cover 97 may be installed before the nuts 296 are secured to the studs 295 as shown in FIGS. 17-18.

Figure 2:
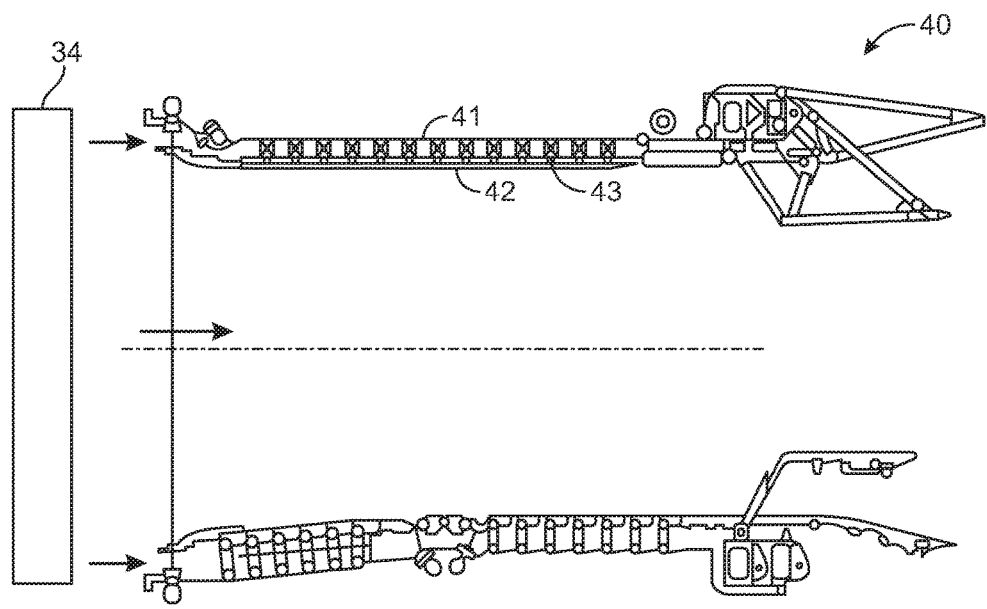
FIG. 2 is another sectional view of a prior art exhaust duct for a gas turbine engine equipped with a conventional heat shield liner.
Figure 19:
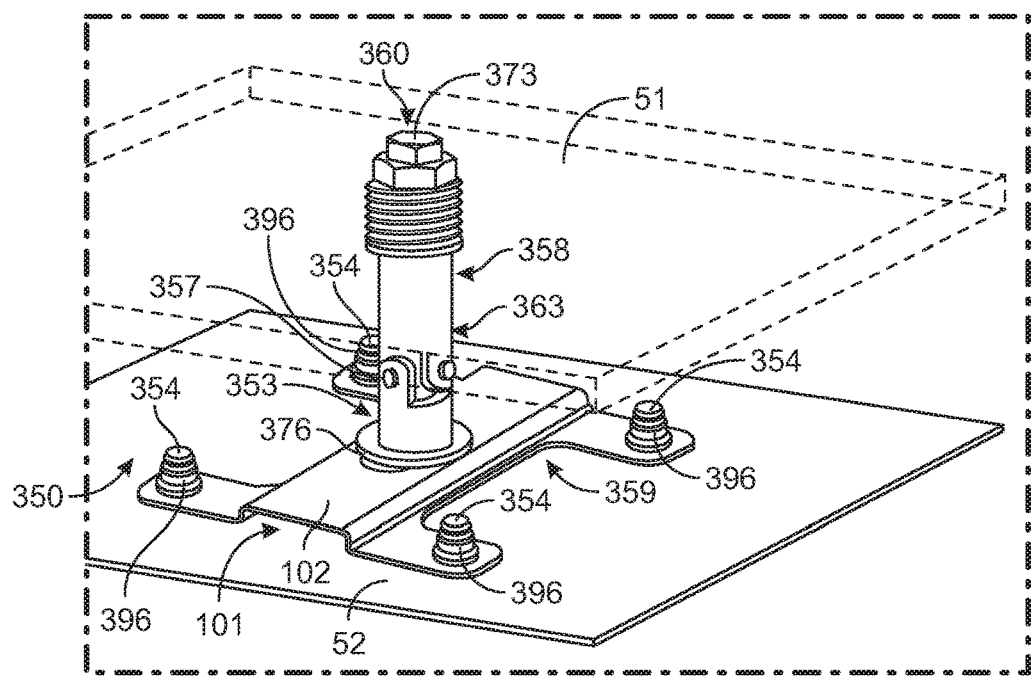
FIG. 19 is a perspective view of yet another disclosed hanger assembly connecting a liner to a case.
Figure 20:
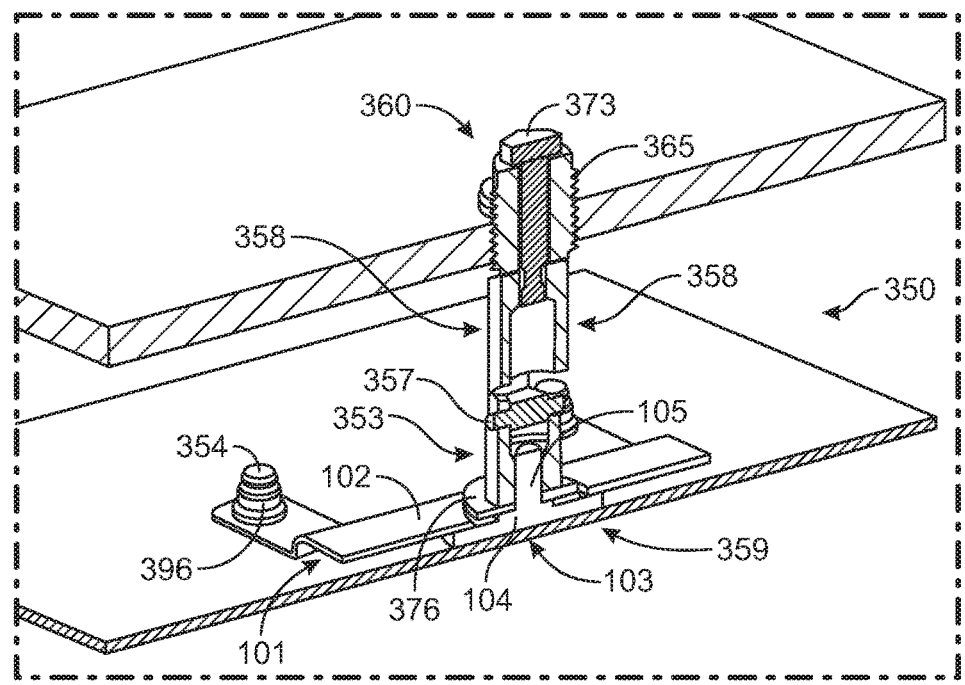
FIG. 20 is a perspective and sectional view of the hanger assembly shown in FIG. 19.
Figure 21:
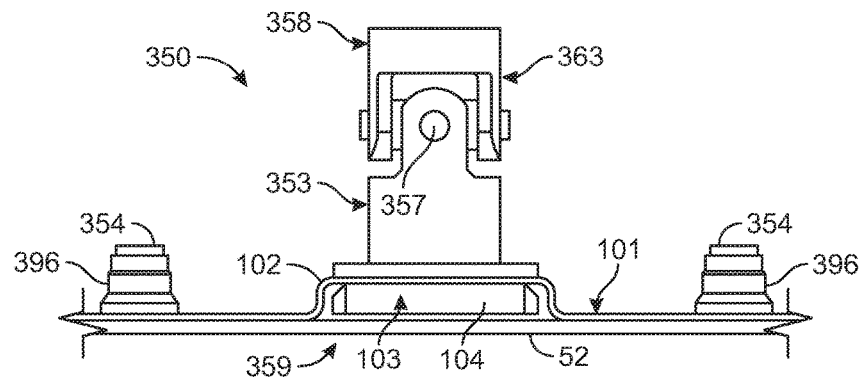
FIG. 21 is a plan view further illustrating the liner attachment assembly of the hanger assembly shown in FIGS. 19-20.
Figure 22:
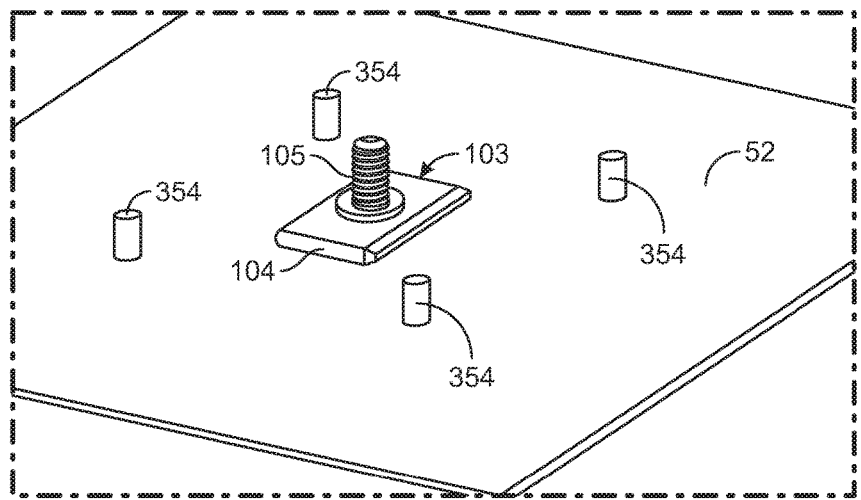
FIGS. 22-25 illustrate the assembly sequence for the hanger assembly disclosed in FIGS. 19-21.
Figure 23:
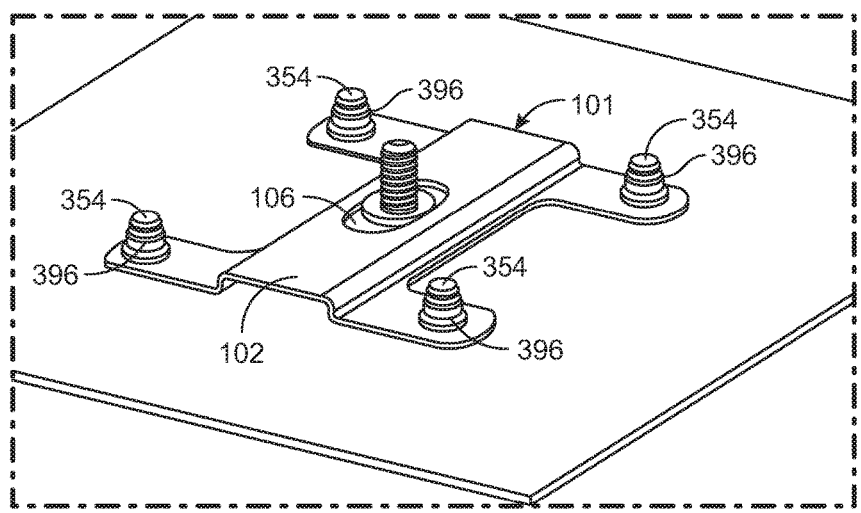

Yet another hanger assembly 350 is illustrated in FIGS. 19-25. The hanger assembly 350 is not secured to the liner 52 via a stud 154 (FIG. 3-18) or 54 (FIG. 2) but, instead, the liner attachment assembly 359 may include a bracket 101 that may be mounted to the liner 52. The bracket 101 may be secured to the liner 52 by four studs 354 and four nuts 396. As shown in FIGS. 19-20, the bracket 101 may include a raised section 102 which, as shown in FIG. 20 receives a captive bolt 103. The term captive bolt 103 is used here because the bolt 103 has a rectangular head 104 as shown in FIG. 22 and an upwardly protruding threaded stud 105. The rectangular head 104 is unable to turn when it is trapped between the raised section 102 of the bracket 101 and the liner 52. As a result, the head 104 may slide laterally or translationally without rotation. The hanger assembly 350 may also include a washer 376 disposed between the first segment 353 and the bracket 101. The first segment 353, second segment 358 and cross member 357 form the pivoting joint 363. As shown in FIG. 20, the second segment 358 may be connected to the case 51 by a case attachment assembly 360 that may include a threaded bushing 365 and the fastener 373. As shown in FIG. 23, the bracket 101 permits the bolt 103 to slide laterally (translational movement) within the slot 106 but not rotate within the raised section 102.

Figure 24:
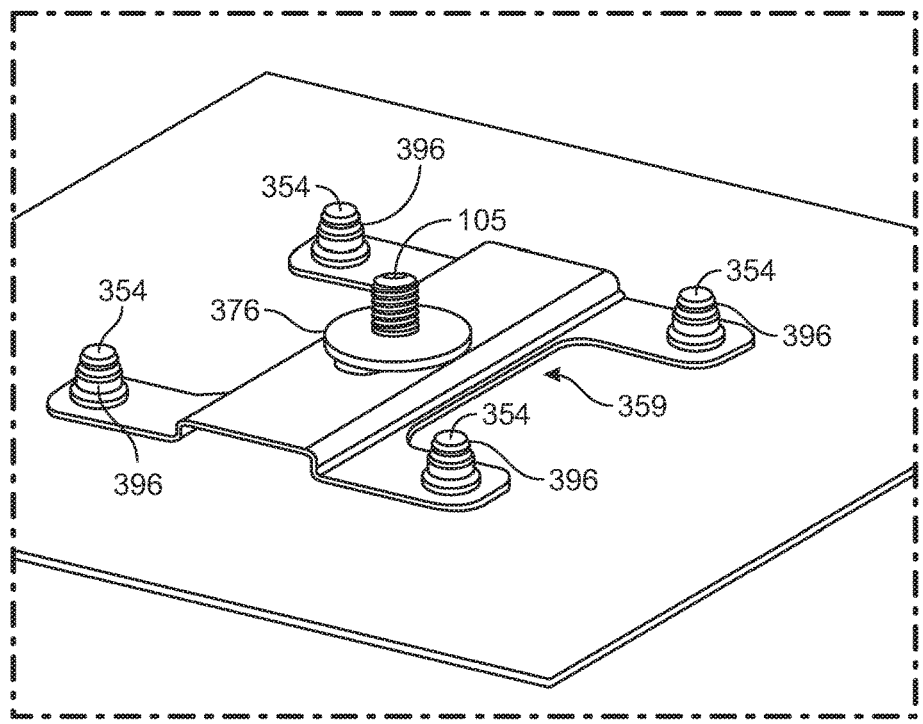
Figure 25:
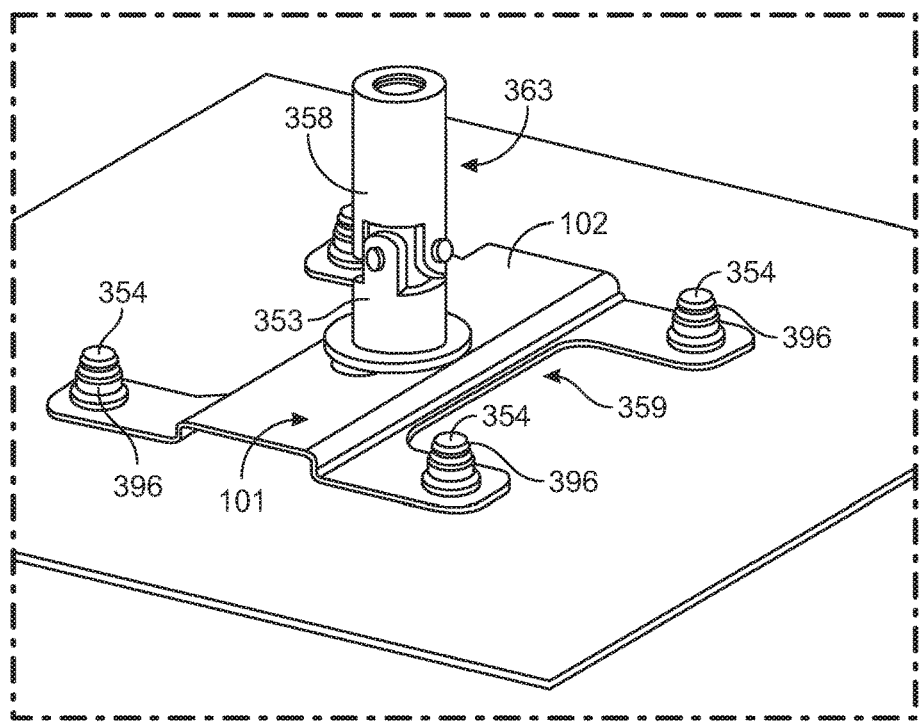

The hanger assembly 350 may be assembled according to the sequence set forth in FIGS. 22-23. First, as shown in FIG. 22, the bolt 103 may be placed on the liner 52 between four studs 354. A precise alignment is not required because, as shown in FIG. 23, the bracket 101 may include a slot 106 that can easily accommodate the stud 105 of the bolt 103 to permit translational or lateral movement. The bracket 101 may be secured to the four studs 354 with the four nuts 396 as shown. The washer 376 may be placed over the stud 105 as shown in FIG. 24 and the preassembled pivoting joint 363 may be screwed onto the stud 105 as shown in FIG. 25. The attachment of the second segment 358 to the bushing 365 and fastener 73 is illustrated in FIGS. 19-20.

While only certain embodiments have been set forth, alternatives and modifications will be apparent from the above description to those skilled in the art. These and other alternatives are considered equivalents and within the spirit and scope of this disclosure and the appended claims.

INDUSTRIAL APPLICABILITY

A variety of hanger assemblies 50, 150, 250, 350 are disclosed for connecting a heat shield liner 52 to a case 51 of a gas turbine engine. Each hanger assembly 50, 150, 250, 350 may include a pivoting joint 63, 163, 263, 363 which provides some translational or lateral movement of the liner 52 with respect to the case 51. Further, each hanger assembly 50, 150, 250, 350 may also include a liner attachment assembly 59, 159, 259, 359 or a case attachment assembly 60, 160, 260, 360 that permits additional translational or lateral movement. The use of threaded connections, while not required, enables the hanger assemblies 50, 150, 250, 350 to be adjustable. The disclosed hanger assemblies 50, 150, 250, 350 are easy to assemble and can be adjusted outside of the case 51. Self-locking threads may be utilized, but are not required.

The invention claimed is:

1. A hanger assembly for coupling a heat shield liner to a case, the hanger assembly comprising:
   a pivoting joint coupling a first segment to a second segment, the first segment being coupled to the heat shield liner by a liner attachment assembly, the second segment being coupled to the case by a case attachment assembly;
   at least one of the liner attachment assembly and the case attachment assembly permitting translational movement of the first segment or the second segment, respectively, with respect to the case,
   wherein the case attachment assembly includes an annular outer bushing passing through and connected to the case, the annular outer bushing accommodating a fastener that couples the annular outer bushing to the second segment, the fastener being spaced apart from the annular outer bushing to define an annular gap between the fastener and the annular outer bushing that permits translational movement of the second segment and the fastener with respect to the annular outer bushing and the case.

2. The hanger assembly of claim 1, wherein the fastener includes a proximal threaded section that connects the fastener to the second segment, the fastener also including a distal head and a middle shoulder section disposed between the proximal threaded section and the distal head that is wider than the proximal threaded section, the middle shoulder section being longer than the annular outer bushing to provide at least one clearance gap between the distal head and the annular outer bushing or between the second segment and the annular outer bushing that permits translational movement of the second segment and the fastener with respect to the annular outer bushing and the case.

3. The hanger assembly of claim 2 further comprising: a washer disposed between the distal head of the fastener and the annular outer bushing.

4. The hanger assembly of claim 1, wherein the liner attachment assembly includes a stud connected to the heat shield liner and threadably connected to the first segment.

5. The hanger assembly of claim 1, wherein the first segment includes a distal forked end that is pivotally connected to a cross member and the second segment includes a proximal forked end that is pivotally connected to the cross member, the cross member pivotally coupling the second segment to the first segment to form the pivoting joint.

6. The hanger assembly of claim 1, wherein the second segment includes a distal end that is pivotally connected to a swivel, and the first segment includes a distal forked end that is pivotally connected to a cross member that passes through the swivel to form the pivoting joint.

7. The hanger assembly of claim 1, wherein the first segment includes a distal end that is pivotally connected to a swivel, and the second segment includes a proximal forked end that is pivotally connected to a cross member that passes through the swivel to form the pivoting joint.

8. A hanger assembly for coupling a heat shield liner to a case, the hanger assembly comprising:
   a pivoting joint coupling a first segment to a second segment, the first segment being coupled to the heat shield liner by a liner attachment assembly, the second segment being coupled to the case by a case attachment assembly;

at least one of the liner attachment assembly and the case attachment assembly permitting translation movement of the first segment or the second segment, respectively, with respect to the case, wherein the case attachment assembly includes an annular outer bushing passing through and connected to the case, the annular outer bushing accommodates an annular inner bushing, the annular inner bushing is coupled to a fastener that couples the annular inner bushing to the second segment, the annular inner bushing is spaced apart from the annular outer bushing to define an annular gap between the annular outer bushing and the annular inner bushing that permits translational movement of the second segment and the fastener with respect to the annular outer bushing and the case.

9. The hanger assembly of claim 8, wherein the fastener includes a distal head and a proximal threaded section that couples the annular inner bushing to the second segment, the annular inner bushing is longer than the annular outer bushing to provide at least one clearance gap between the distal head of the fastener and the annular outer bushing that permits translational movement of the second segment and the fastener with respect to the annular outer bushing and the case.

10. The hanger assembly of claim 8, wherein the fastener includes a distal head and a proximal threaded section that couples the annular inner bushing to the second segment, the fastener passing through a washer that is trapped between the distal head and the annular inner bushing, the annular inner bushing being longer than the annular outer bushing to provide at least one clearance gap between the washer and the annular outer bushing that permits translational movement of the second segment and the fastener with respect to the annular outer bushing and the case.

11. The hanger assembly of claim 8, wherein the liner attachment assembly includes a stud connected to the heat shield liner and threadably connected to the first segment.

12. The hanger assembly of claim 8, wherein the first segment includes a distal forked end that is pivotally connected to a cross member and the second segment includes a proximal forked end that is pivotally connected to the cross member, the cross member pivotally coupling the second segment to the first segment to form the pivoting joint.

13. The hanger assembly of claim 8, wherein the second segment includes a distal end that is pivotally connected to a swivel, and the first segment includes a distal forked end that is pivotally connected to a cross member that passes through the swivel to form the pivoting joint.

14. The hanger assembly of claim 8, wherein the first segment includes a distal end that is pivotally connected to a swivel, and the second segment includes a proximal forked end that is pivotally connected to a cross member that passes through the swivel to form the pivoting joint.

15. A hanger assembly for coupling a heat shield liner to a case, the hanger assembly comprising:
a pivoting joint coupling a first segment to a second segment, the first segment being coupled to the heat shield liner by a liner attachment assembly, the second segment being coupled to the case by a case attachment assembly;
at least one of the liner attachment assembly and the case attachment assembly permitting translational movement of the first segment or the second segment, respectively, with respect to the case,
wherein the case attachment assembly includes a washer plate disposed opposite the case from the second segment, the washer plate including a slot and at least one opening, the washer plate being connected to the case by at least one stud that is connected to the case and passes through the at least one opening, the second segment being connected to the case by a bolt having a proximal threaded end connected to the second segment and a distal head that is slidably disposed above the slot of the washer plate to permit translational movement of the second segment and the bolt along the slot.

16. The hanger assembly of claim 15 further comprising: a cover disposed over the washer plate with the washer plate being disposed between the cover and the case, the distal head being disposed between the washer plate and the cover, and the cover being spaced apart from the distal head to permit translational movement of the distal head along the slot.

17. The hanger assembly of claim 15, wherein the liner attachment assembly includes a stud connected to the heat shield liner and threadably connected to the first segment.

18. A hanger assembly for coupling a heat shield liner to a case, the hanger assembly comprising:
a pivoting joint coupling a first segment to a second segment, the first segment being coupled to the heat shield liner by a liner attachment assembly, the second segment being coupled to the case by a case attachment assembly;
at least one of the liner attachment assembly and the case attachment assembly permitting translational movement of the first segment or the second segment, respectively, with respect to the case,
wherein the case attachment assembly includes an annular bushing that is threadably connected to the case and a fastener that passes through the annular bushing and is connected to the second segment,
the liner attachment assembly including a bracket connected to the heat shield liner, the bracket including a raised section with a slot disposed in the raised section, the first segment having a proximal threaded end that is connected to a distal threaded end of a bolt, the bolt having a proximal head that is trapped between the raised section of the bracket and the heat shield liner, the slot permitting translational movement of the proximal head of the bolt and the first segment.

19. A hanger assembly for coupling a heat shield liner to a case, the hanger assembly comprising:
a pivoting joint coupling a first segment to a second segment, the first segment being coupled to the heat shield liner by a liner attachment assembly, the second segment being coupled to the case by a case attachment assembly;
at least one of the liner attachment assembly and the case attachment assembly permitting translational movement of the first segment or the second segment, respectively, with respect to the case,
wherein the case attachment assembly includes an elongated washer plate disposed opposite the case from the second segment, the elongated washer plate including a center slot disposed between a pair of openings, the openings each being connected to the case by a respective stud that is connected to the case, the second segment being connected to the case by a bolt having a proximal threaded end connected to the second segment and a distal head that is slidably disposed above the center slot of the elongated washer plate to permit translational movement of the second segment and the bolt along the center slot; and wherein the liner attachment assembly includes a stud connected to the heat shield liner that is threadably received in a threaded hole disposed at a proximal end of the first segment.

20. A hanger assembly for coupling a heat shield liner to a case, the hanger assembly comprising:
- a pivoting joint coupling a first segment to a second segment, the first segment being coupled to the case by a case attachment assembly;
- at least one of the liner attachment assembly and the case attachment assembly permitting translational movement of the first segment or the second segment, respectively, with respect to the case,
- wherein the case attachment assembly includes an annular bushing that is threadably connected to the case and a fastener that passes through the annular bushing and is connected to the second segment,
- the liner attachment assembly including a bracket connected to the heat shield liner, the bracket including a raised section, the first segment having a proximal threaded end that is connected to a threaded end of a bolt, the bolt having a shaped head that is trapped between the raised section of the bracket and the heat shield liner, the shaped head being prevented from rotating within the raised section, the raised section permitting translational movement of the head of the bolt and the first segment.

* * * * *